US012713390B2

(12) United States Patent
Keshavamurthy et al.

(10) Patent No.: US 12,713,390 B2
(45) Date of Patent: Aug. 18, 2026

(54) DETERMINING SUBSET OF CANDIDATE POSITIONING ANCHORS

(71) Applicant: Nokia Technologies Oy, Espoo (FI)

(72) Inventors: Prajwal Keshavamurthy, Munich (DE); Stepan Kucera, Munich (DE); Diomidis Michalopoulos, Munich (DE); Taylan Sahin, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/269,353

(22) Filed: Jul. 15, 2025

(65) Prior Publication Data

US 2025/0344183 A1 Nov. 6, 2025

Related U.S. Application Data

(63) Continuation of application No. PCT/EP2024/052438, filed on Feb. 1, 2024.

(30) Foreign Application Priority Data

Feb. 7, 2023 (GB) ..................................... 2301702

(51) Int. Cl.
*H04W 64/00* (2009.01)

(52) U.S. Cl.
CPC ................................. *H04W 64/006* (2013.01)

(58) Field of Classification Search
None
See application file for complete search history.

(56) References Cited

U.S. PATENT DOCUMENTS

2019/0239181 A1 8/2019 Gangakhedkar et al.
2022/0015057 A1* 1/2022 Bao ....................... H04W 76/14
2022/0070712 A1* 3/2022 Bao ....................... G01S 5/0036
(Continued)

FOREIGN PATENT DOCUMENTS

WO 2022/010910 A1 1/2022
WO 2022/211889 A1 10/2022
(Continued)

OTHER PUBLICATIONS

"Revised SID on Study on expanded and improved NR positioning", 3GPP TSG RAN Meeting #94e, RP-213588, Agenda Item: 8.6.1, Intel, Dec. 6-17, 2021, 5 pages.
(Continued)

*Primary Examiner* — German Viana Di Prisco
(74) *Attorney, Agent, or Firm* — Nokia Technologies Oy

(57) ABSTRACT

Disclosed is a method comprising receiving, by an apparatus, assistance information associated with at least one of: at least one positioning anchor of the apparatus to be replaced, or at least one positioning anchor to be added for the apparatus; determining, by the apparatus, based on the assistance information, a subset of one or more candidate positioning anchors from a set of one or more discovered candidate positioning anchors, wherein the subset of one or more candidate positioning anchors fulfil at least one criterion associated with at least one of: the at least one positioning anchor of the apparatus to be replaced, or the at least one positioning anchor to be added for the apparatus; and transmitting, by the apparatus, measurement information associated with the subset of one or more candidate positioning anchors.

18 Claims, 7 Drawing Sheets

601 Receive assistance information

602 Determine subset of one or more candidate positioning anchors

603 Transmit measurement information associated with the subset of one or more candidate positioning anchors

(56) References Cited

U.S. PATENT DOCUMENTS

| | | | | |
|---|---|---|---|---|
| 2022/0110088 | A1* | 4/2022 | Bao | G01S 5/0205 |
| 2022/0231805 | A1 | 7/2022 | Bao et al. | |
| 2022/0248366 | A1* | 8/2022 | Bao | H04W 64/006 |
| 2022/0272592 | A1* | 8/2022 | Choi | H04W 36/0009 |
| 2022/0394659 | A1 | 12/2022 | Vassilovski et al. | |
| 2023/0042138 | A1* | 2/2023 | Shin | H04L 5/0048 |
| 2023/0047361 | A1* | 2/2023 | Bao | H04W 72/51 |
| 2023/0362874 | A1* | 11/2023 | Wang | H04W 64/00 |
| 2024/0118370 | A1* | 4/2024 | Duan | G01S 5/0242 |
| 2024/0291607 | A1* | 8/2024 | Sahin | H04L 5/0005 |
| 2024/0365276 | A1* | 10/2024 | Yang | G01S 5/10 |
| 2025/0008470 | A1* | 1/2025 | Dai | H04B 17/328 |

FOREIGN PATENT DOCUMENTS

| | | | |
|---|---|---|---|
| WO | 2022/211890 | A1 | 10/2022 |
| WO | 2023/282914 | A1 | 1/2023 |

OTHER PUBLICATIONS

"3rd Generation Partnership Project; Technical Specification Group Radio Access Network; Study on scenarios and requirements of in-coverage, partial coverage, and out-of-coverage NR positioning use cases (Release 17)", 3GPP TR 38.845, V17.0.0, Sep. 2021, pp. 1-16.

"3rd Generation Partnership Project; Technical Specification Group Services and System Aspects; Service requirements for cyber-physical control applications in vertical domains; Stage 1 (Release 18)", 3GPP TS 22.104, V18.3.0, Dec. 2021, pp. 1-101.

"3rd Generation Partnership Project; Technical Specification Group Services and System Aspects; Service requirements for the 5G system; Stage 1 (Release 19)", 3GPP TS 22.261, V19.1.0, Dec. 2022, pp. 1-115.

"LS reply to 3GPP RAN on requirements of in-coverage, partial coverage, and out-of-coverage positioning use cases",3GPP TSG RAN Meeting #91e, RP-210040, 5GAA, Mar. 16-26, 2021, 5 pages.

"3rd Generation Partnership Project; Technical Specification Group Services and System Aspects; Proximity based Services (ProSe) in the 5G System (5GS) (Release 18)", 3GPP TS 23.304, V18.0.0, Dec. 2022, pp. 1-122.

"3rd Generation Partnership Project; Technical Specification Group Radio Access Network; NR; NR and NG-RAN Overall Description, Stage 2 (Release 17)", 3GPP TS 38.300, V17.2.0, Sep. 2022, pp. 1-210.

"NW Assisted Ranging and Protocol Name and terminologies", 3GPP TSG-RAN WG2 Meeting #120, R2-2212359, Agenda Item: 8.2.2, Ericsson, Nov. 14-18, 2022, pp. 1-5.

"Discussion on Sidelink Positioning", 3GPP RAN WG2 Meeting #120, R2-2212506, Agenda Item: 8.2.2, InterDigital Inc, Nov. 14-18, 2022, pp. 1-9.

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.

"3rd Generation Partnership Project; Technical Specification Group Radio Access Network; NR; Radio Resource Control (RRC) protocol specification (Release 17)", 3GPP TS 38.331, V17.2.0. Sep. 2022, pp. 1-1298.

"Considerations on Sidelink positioning", 3GPP TSG-RAN WG2 Meeting #120, R2-2212710, Agenda item: 8.2.2, CMCC, Nov. 14-18, 2022, pp. 1-6.

Search Report received for corresponding United Kingdom Patent Application No. GB2301702.3, dated Jul. 20, 2023, 3 pages.

"Considerations on anchor UE discovery, selection and utilization", 3GPP TSG-RAN WG2 Meeting #121, R2-2300585, Agenda item: 8.2.2, Nokia, Feb. 27-Mar. 3, 2023, 7 pages.

"Discussion of signalling procedures", 3GPP TSG-RAN WG2 Meeting #121-bis-e, R2-2302655, Agenda item: 7:2.2, Nokia, Apr. 17-26, 2023, 9 pages.

"Discussion of signalling procedures", 3GPP TSG-RAN WG2 Meeting #122, R2-2304716, Agenda item: 7.2.2, Nokia, May 22-26, 2023, 9 pages.

International Search Report and Written Opinion received for corresponding Patent Cooperation Treaty Application No. PCT/EP2024/052438, dated May 16, 2024, 14 pages.

"Study of signalling procedures and design considerations for sidelink positioning", 3GPP TSG-RAN WG2 Meeting #120, R2-2212470, Agenda Item: 8.2.2, LG Electronics, pp. Nov. 14-18, 2022, 24 pages.

Office action received for corresponding European Patent Application No. 24705370.5, dated Jan. 27, 2026, 5 pages.

* cited by examiner

DETERMINING SUBSET OF CANDIDATE POSITIONING ANCHORS

FIELD

The following example embodiments relate to wireless communication and to positioning.

BACKGROUND

Positioning technologies may be used to estimate a location of a user device. However, positioning involves usage of network resources. As resources are limited, it is desirable to optimize the usage of network resources.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions that, when executed by the at least one processor, cause the apparatus at least to: receive assistance information associated with at least one of: at least one positioning anchor of the apparatus to be replaced, or at least one positioning anchor to be added for the apparatus; determine, based on the assistance information, a subset of one or more candidate positioning anchors from a set of one or more discovered candidate positioning anchors, wherein the subset of one or more candidate positioning anchors fulfil at least one criterion associated with at least one of: the at least one positioning anchor of the apparatus to be replaced, or the at least one positioning anchor to be added for the apparatus; and transmit measurement information associated with the subset of one or more candidate positioning anchors.

According to another aspect, there is provided an apparatus comprising: means for receiving assistance information associated with at least one of: at least one positioning anchor of the apparatus to be replaced, or at least one positioning anchor to be added for the apparatus; means for determining, based on the assistance information, a subset of one or more candidate positioning anchors from a set of one or more discovered candidate positioning anchors, wherein the subset of one or more candidate positioning anchors fulfil at least one criterion associated with at least one of: the at least one positioning anchor of the apparatus to be replaced, or the at least one positioning anchor to be added for the apparatus; and means for transmitting measurement information associated with the subset of one or more candidate positioning anchors.

According to another aspect, there is provided a method comprising: receiving, by an apparatus, assistance information associated with at least one of: at least one positioning anchor of the apparatus to be replaced, or at least one positioning anchor to be added for the apparatus; determining, by the apparatus, based on the assistance information, a subset of one or more candidate positioning anchors from a set of one or more discovered candidate positioning anchors, wherein the subset of one or more candidate positioning anchors fulfil at least one criterion associated with at least one of: the at least one positioning anchor of the apparatus to be replaced, or the at least one positioning anchor to be added for the apparatus; and transmitting, by the apparatus, measurement information associated with the subset of one or more candidate positioning anchors.

According to another aspect, there is provided a computer program comprising instructions which, when executed by an apparatus, cause the apparatus to perform at least the following: receiving assistance information associated with at least one of: at least one positioning anchor of the apparatus to be replaced, or at least one positioning anchor to be added for the apparatus; determining, based on the assistance information, a subset of one or more candidate positioning anchors from a set of one or more discovered candidate positioning anchors, wherein the subset of one or more candidate positioning anchors fulfil at least one criterion associated with at least one of: the at least one positioning anchor of the apparatus to be replaced, or the at least one positioning anchor to be added for the apparatus; and transmitting measurement information associated with the subset of one or more candidate positioning anchors.

According to another aspect, there is provided a computer readable medium comprising program instructions which, when executed by an apparatus, cause the apparatus to perform at least the following: receiving assistance information associated with at least one of: at least one positioning anchor of the apparatus to be replaced, or at least one positioning anchor to be added for the apparatus; determining, based on the assistance information, a subset of one or more candidate positioning anchors from a set of one or more discovered candidate positioning anchors, wherein the subset of one or more candidate positioning anchors fulfil at least one criterion associated with at least one of: the at least one positioning anchor of the apparatus to be replaced, or the at least one positioning anchor to be added for the apparatus; and transmitting measurement information associated with the subset of one or more candidate positioning anchors.

According to another aspect, there is provided a non-transitory computer readable medium comprising program instructions which, when executed by an apparatus, cause the apparatus to perform at least the following: receiving assistance information associated with at least one of: at least one positioning anchor of the apparatus to be replaced, or at least one positioning anchor to be added for the apparatus; determining, based on the assistance information, a subset of one or more candidate positioning anchors from a set of one or more discovered candidate positioning anchors, wherein the subset of one or more candidate positioning anchors fulfil at least one criterion associated with at least one of: the at least one positioning anchor of the apparatus to be replaced, or the at least one positioning anchor to be added for the apparatus; and transmitting measurement information associated with the subset of one or more candidate positioning anchors.

According to another aspect, there is provided an apparatus comprising at least one processor, and at least one memory storing instructions that, when executed by the at least one processor, cause the apparatus at least to: generate assistance information for assisting a user device to determine a subset of one or more candidate positioning anchors from a set of one or more discovered candidate positioning anchors, wherein the assistance information is associated with at least one of: at least one positioning anchor of the user device to be replaced, or at least one positioning anchor to be added for the user device; transmit the assistance information to the user device; and receive, from the user device, measurement information associated with the subset of one or more candidate positioning anchors, wherein the subset of one or more candidate positioning anchors fulfil at least one criterion associated with at least one of: the at least one positioning anchor of the user device to be replaced, or the at least one positioning anchor to be added for the user device.

According to another aspect, there is provided an apparatus comprising: means for generating assistance information for assisting a user device to determine a subset of one or more candidate positioning anchors from a set of one or more discovered candidate positioning anchors, wherein the assistance information is associated with at least one of: at least one positioning anchor of the user device to be replaced, or at least one positioning anchor to be added for the user device; means for transmitting the assistance information to the user device; and means for receiving, from the user device, measurement information associated with the subset of one or more candidate positioning anchors, wherein the subset of one or more candidate positioning anchors fulfil at least one criterion associated with at least one of: the at least one positioning anchor of the user device to be replaced, or the at least one positioning anchor to be added for the user device.

According to another aspect, there is provided a method comprising: generating assistance information for assisting a user device to determine a subset of one or more candidate positioning anchors from a set of one or more discovered candidate positioning anchors, wherein the assistance information is associated with at least one of: at least one positioning anchor of the user device to be replaced, or at least one positioning anchor to be added for the user device; transmitting the assistance information to the user device; and receiving, from the user device, measurement information associated with the subset of one or more candidate positioning anchors, wherein the subset of one or more candidate positioning anchors fulfil at least one criterion associated with at least one of: the at least one positioning anchor of the user device to be replaced, or the at least one positioning anchor to be added for the user device.

According to another aspect, there is provided a computer program comprising instructions which, when executed by an apparatus, cause the apparatus to perform at least the following: generating assistance information for assisting a user device to determine a subset of one or more candidate positioning anchors from a set of one or more discovered candidate positioning anchors, wherein the assistance information is associated with at least one of: at least one positioning anchor of the user device to be replaced, or at least one positioning anchor to be added for the user device; transmitting the assistance information to the user device; and receiving, from the user device, measurement information associated with the subset of one or more candidate positioning anchors, wherein the subset of one or more candidate positioning anchors fulfil at least one criterion associated with at least one of: the at least one positioning anchor of the user device to be replaced, or the at least one positioning anchor to be added for the user device.

According to another aspect, there is provided a computer readable medium comprising program instructions which, when executed by an apparatus, cause the apparatus to perform at least the following: generating assistance information for assisting a user device to determine a subset of one or more candidate positioning anchors from a set of one or more discovered candidate positioning anchors, wherein the assistance information is associated with at least one of: at least one positioning anchor of the user device to be replaced, or at least one positioning anchor to be added for the user device; transmitting the assistance information to the user device; and receiving, from the user device, measurement information associated with the subset of one or more candidate positioning anchors, wherein the subset of one or more candidate positioning anchors fulfil at least one criterion associated with at least one of: the at least one positioning anchor of the user device to be replaced, or the at least one positioning anchor to be added for the user device.

According to another aspect, there is provided a non-transitory computer readable medium comprising program instructions which, when executed by an apparatus, cause the apparatus to perform at least the following: generating assistance information for assisting a user device to determine a subset of one or more candidate positioning anchors from a set of one or more discovered candidate positioning anchors, wherein the assistance information is associated with at least one of: at least one positioning anchor of the user device to be replaced, or at least one positioning anchor to be added for the user device; transmitting the assistance information to the user device; and receiving, from the user device, measurement information associated with the subset of one or more candidate positioning anchors, wherein the subset of one or more candidate positioning anchors fulfil at least one criterion associated with at least one of: the at least one positioning anchor of the user device to be replaced, or the at least one positioning anchor to be added for the user device.

LIST OF DRAWINGS

In the following, various example embodiments will be described in greater detail with reference to the accompanying drawings, in which FIG. 1 illustrates an example of a cellular communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), beyond 5G, or sixth generation (6G) without restricting the example embodiments to such an architecture, however. It is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
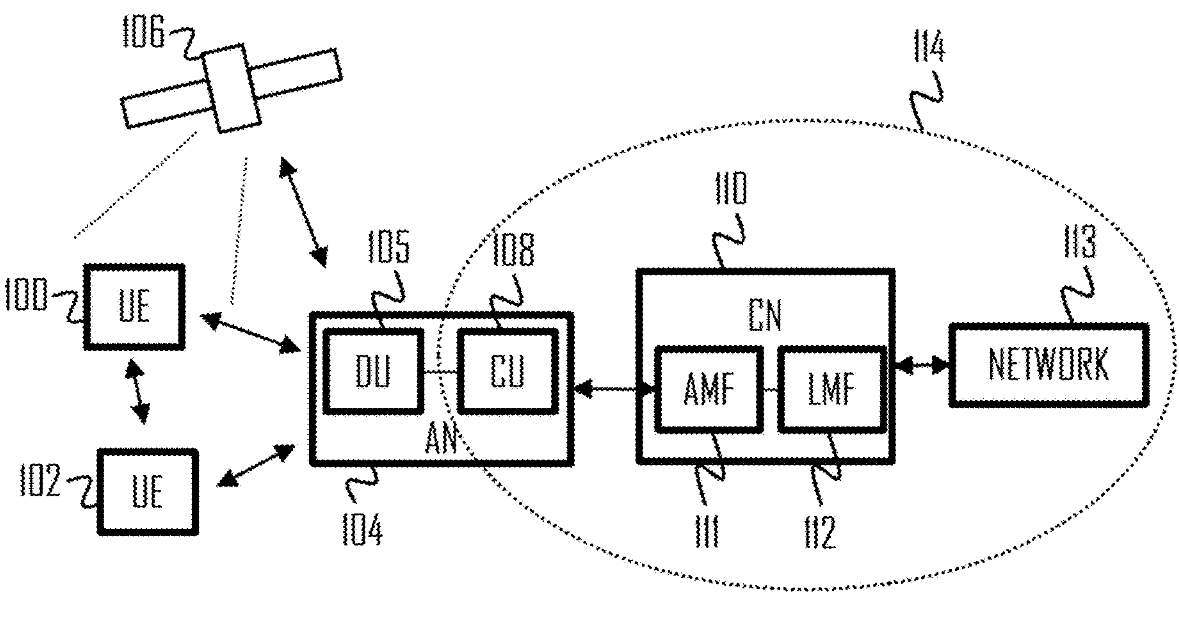

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a radio cell with an access node (AN) 104, such as an evolved Node B (abbreviated as eNB or eNodeB) or a next generation Node B (abbreviated as gNB or gNodeB), providing the radio cell. The physical link from a user device to an access node may be called uplink (UL) or reverse link, and the physical link from the access node to the user device may be called downlink (DL) or forward link. A user device may also communicate directly with another user device via sidelink (SL) communication. It should be appreciated that access nodes or their functionalities may be implemented by using any node, host, server or access point etc. entity suitable for such a usage.

A communication system may comprise more than one access node, in which case the access nodes may also be configured to communicate with one another over links, wired or wireless, designed for the purpose. These links may be used for signaling purposes and also for routing data from one access node to another. The access node may be a computing device configured to control the radio resources of communication system it is coupled to. The access node may also be referred to as a base station, a base transceiver station (BTS), an access point or any other type of interfacing device including a relay station capable of operating in a wireless environment. The access node may include or be coupled to transceivers. From the transceivers of the access node, a connection may be provided to an antenna unit that establishes bi-directional radio links to user devices. The antenna unit may comprise a plurality of antennas or antenna elements. The access node may further be connected to a core network 110 (CN or next generation core NGC). Depending on the deployed technology, the counterpart that the access node may be connected to on the CN side may be a serving gateway (S-GW, routing and forwarding user data packets), packet data network gateway (P-GW) for providing connectivity of user devices to external packet data networks, user plane function (UPF), mobility management entity (MME), or an access and mobility management function (AMF), etc.

With respect to positioning, the service-based architecture (core network) may comprise an AMF 111 and a location management function (LMF) 112. The AMF may provide location information for call processing, policy, and charging to other network functions in the core network and to other entities requesting for positioning of terminal devices. The AMF may receive and manage location requests from several sources: mobile-originated location requests (MO-LR) from the user devices and mobile-terminated location requests (MT-LR) from other functions of the core network or from other network elements. The AMF may select the LMF for a given request and use its positioning service to trigger a positioning session. The LMF may then carry out the positioning upon receiving such a request from the AMF. The LMF may manage the resources and timing of positioning activities. The LMF may use a Namf_Communication service on an NL1 interface to request positioning of a user device from one or more access nodes, or the LMF may communicate with the user device over N1 for UE-based or UE-assisted positioning. The positioning may include estimation of a location and, additionally, the LMF may also estimate movement or accuracy of the location information when requested. Connection-wise, the AMF may be between the access node and the LMF and, thus, closer to the access nodes than the LMF.

The user device illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

Another example of such a relay node may be a layer 1 relay called a repeater. The repeater may amplify a signal received from an access node and forward it to a user device, and/or amplify a signal received from the user device and forward it to the access node.

The user device may also be called a subscriber unit, mobile station, remote terminal, access terminal, user terminal, terminal device, or user equipment (UE) just to mention but a few names or apparatuses. The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, reduced capability (RedCap) device, wireless sensor device, or any device integrated in a vehicle.

It should be appreciated that a user device may also be a nearly exclusive uplink-only device, of which an example may be a camera or video camera loading images or video clips to a network. A user device may also be a device having capability to operate in Internet of Things (loT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud or in another user device. The user device (or in some example embodiments a layer 3 relay node) may be configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may have multiple radio interfaces, namely below 6 GHz, cmWave and mmWave, and also being integrable with existing legacy radio access technologies, such as the LTE. Integration with the LTE may be implemented, for example, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz—cmWave—mmWave). One of the concepts considered to be used in 5G networks may be network slicing, in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with one or more other networks 113, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or the like, providing facilities for networks of different operators to cooperate for example in spectrum sharing.

An access node may also be split into: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be defined as a logical node hosting higher layer protocols, such as radio resource control (RRC), service data adaptation protocol (SDAP) and/or packet data convergence protocol (PDCP), of the access node. The DU 105 may be defined as a logical node hosting radio link control (RLC), medium access control (MAC) and/or physical (PHY) layers of the access node. The operation of the DU may be at least partly controlled by the CU. The CU may comprise a control plane (CU-CP), which may be defined as a logical node hosting the RRC and the control plane part of the PDCP protocol of the CU for the access node. The CU may further comprise a user plane (CU-UP), which may be defined as a logical node hosting the user plane part of the PDCP protocol and the SDAP protocol of the CU for the access node.

Cloud computing platforms may also be used to run the CU 108 and/or DU 105. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of functions between the above-mentioned access node units, or different core network operations and access node operations, may differ.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or an access node comprising radio parts. It is also possible that node operations may be distributed among a plurality of servers, nodes or hosts. Application of cloudRAN architecture enables RAN real-time functions being carried out at the RAN side (e.g., in a DU 105) and non-real-time functions being carried out in a centralized manner (e.g., in a CU 108).

It should also be understood that the distribution of functions between core network operations and access node operations may differ from that of the LTE or even be non-existent. Some other technology advancements that may be used include big data and all-IP, which may change the way networks are being constructed and managed. 5G (or new radio, NR) networks may be designed to support multiple hierarchies, where MEC servers may be placed between the core and the access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). A given satellite 106 in the mega-constellation may cover several satellite-enabled network entities that create on-ground cells. The on-ground cells may be created through an on-ground relay node or by an access node 104 located on-ground or in a satellite.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

It is obvious for a person skilled in the art that the depicted system is only an example of a part of a radio access system and in practice, the system may comprise a plurality of access nodes, the user device may have access to a plurality of radio cells and the system may also comprise other apparatuses, such as physical layer relay nodes or other network elements, etc. At least one of the access nodes may be a Home eNodeB or a Home gNodeB.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) of FIG. 1 may provide any kind of these cells. A cellular radio system may be implemented as a multilayer network including several kinds of radio cells. In multilayer networks, one access node may provide one kind of a radio cell or radio cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's network, may aggregate traffic from a large number of Home eNodeBs or Home gNodeBs back to a core network.

Positioning technologies may be used to estimate a position (e.g., a geographic location) of a user device. Herein the user device to be positioned is referred to as a target user device or target UE. For example, the positioning techniques used in NR may be based on at least one of the following: time difference of arrival (TDoA), time of arrival (TOA), time of departure (TOD), round trip time (RTT), angle of departure (AoD), angle of arrival (AoA), and/or carrier phase.

The position of the target UE may be estimated in an absolute manner (in case of absolute positioning) or in a relative manner (in case of relative positioning).

Absolute positioning refers to estimating the position of the target UE in two-dimensional or three-dimensional geographic coordinates (e.g., latitude, longitude, and/or elevation) within a coordinate system.

Relative positioning refers to estimating the position of the target UE relative to one or more network nodes or relative to one or more other UEs.

In Uu positioning (UL/DL positioning), multiple transmission and reception points (TRPs) in known locations may transmit and/or receive one or more positioning reference signals (PRS) to/from the target UE. In the uplink, a sounding reference signal (SRS) may be used as a positioning reference signal. For example, multilateration techniques may then be used to localize (i.e., position) the target UE with respect to the TRPs. At least one TRP out of these TRPs may be used as a positioning anchor, and the differences in TDoA may be computed with respect to this positioning anchor. The positioning anchor may also be referred to as an anchor, anchor node, multilateration anchor, or reference point.

In network-based positioning, the position of the target UE is calculated by a network node. For network-based positioning, the target UE may report information to the network to enable the calculation.

In UE-based positioning, the position of the target UE is calculated by the target UE or another UE.

Sidelink (SL) positioning refers to the positioning approach, where the target UE utilizes the sidelink (i.e., the direct device-to-device link) to position itself, either in an absolute manner (in case of absolute positioning) or in a relative manner (in case of relative positioning). SL positioning may be beneficial in, for example (but not limited to), the following use cases: public safety, vehicle-to-everything (V2X), and industrial internet of things (IIoT).

SL positioning may be based on the transmission of a sidelink positioning reference signal (SL-PRS) by multiple anchor UEs (anchor user devices), wherein the SL-PRS is received and measured by a target UE to enable localization of the target UE (e.g., using SL TDoA techniques) within certain latency and accuracy requirements of the corresponding SL positioning session. Alternatively, or additionally, the target UE may transmit SL-PRS to be received and measured by the anchor UEs. The exchange of SL-PRS between the target UE and anchor UEs may be used, for example, in SL RTT based positioning techniques.

An anchor UE may be defined as a UE supporting positioning of the target UE, for example by transmitting and/or receiving reference signals (e.g., SL-PRS) for positioning over the SL interface. This may be similar to UL/DL-based positioning, where gNBs may serve as positioning anchors transmitting and/or receiving reference signals to/from target UEs for positioning. Herein an anchor UE may also be referred to as a positioning anchor.

SL PRS refers to a reference signal transmitted over SL for positioning purposes. SL PRS may be configured in terms of various parameters including time-frequency resources, such as bandwidth and periodicity; directivity-related parameters such as beam direction, beam width, number of beams, etc.; and transmit power. Such parameters may be collectively referred to as an SL PRS (pre)configuration.

In a network coverage or partial coverage scenario, the SL PRS configuration may be determined by the network, for example by the location management function (LMF) or gNB. In an out-of-coverage scenario, the SL PRS configuration may be (pre)configured and/or determined by UEs autonomously.

For UE-assisted positioning (in SL positioning and Uu positioning), the target UE may utilize the sidelink to obtain positioning measurements and report the measurements to a network entity such as an LMF. Sidelink positioning may also be used to obtain ranging information. Ranging means determination of the distance between two UEs and/or the direction of one UE from the other one via direct device connection.

In network-assisted sidelink positioning, the network (e.g., LMF) is in control of the sidelink positioning. In this case, the network may perform, for example, anchor (re) selection and/or SL-PRS (re)configuration, etc. For network-assisted sidelink positioning, the UEs may report information, such as sidelink measurements, to the network.

Figure 2:
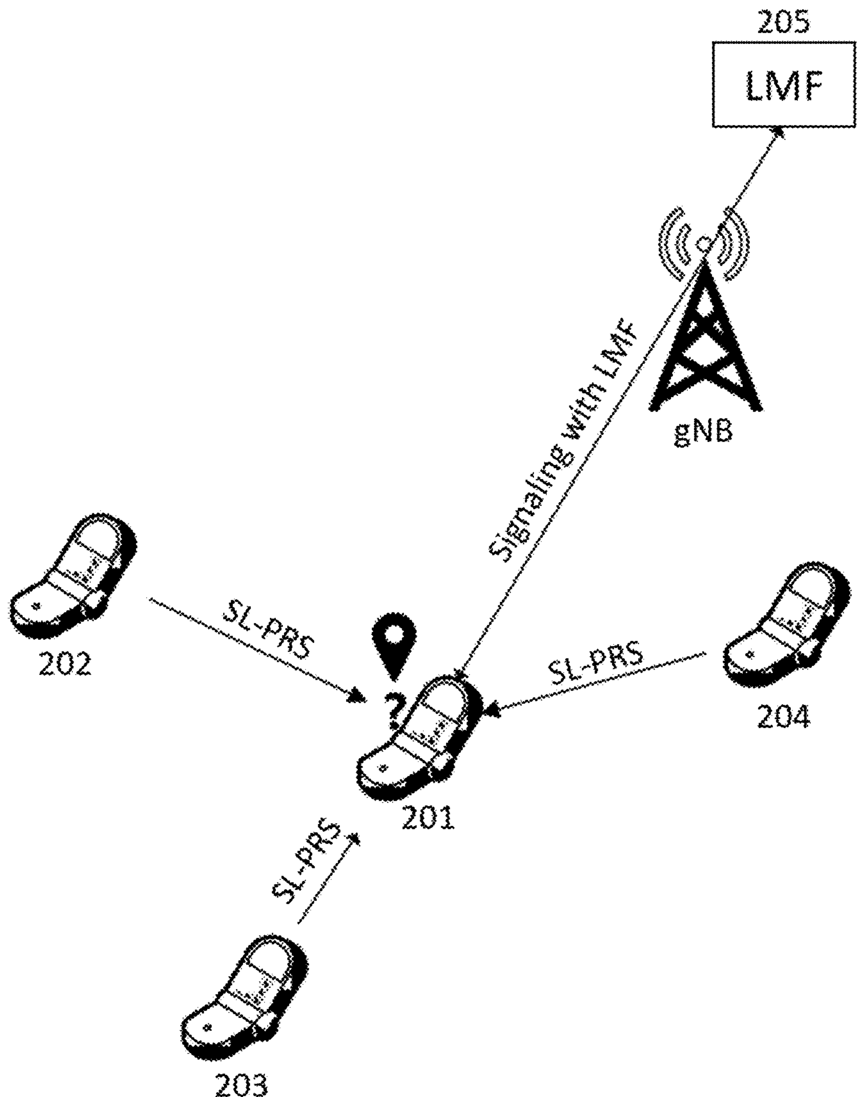
FIG. 2 illustrates an example of a network-assisted sidelink positioning scenario.

FIG. 2 illustrates an example of a network-assisted sidelink positioning scenario, where a target UE 201 is performing a sidelink positioning session, i.e., receiving SL-PRS from three anchor UEs 202, 203, 204 in order to determine the location of the target UE 201. Here, the anchor UEs 202, 203, 204 are said to provide SL-PRS assistance (including SL-PRS transmission) to the target UE 201. The LMF 205 may be in full or partial control of the SL positioning. The LMF 205 is responsible for at least anchor (re)selection based at least on the sidelink measurement information reported from the target UE for example over the LTE positioning protocol (LPP). The target UE may obtain the measurement information by measuring the SL-PRS and/or anchor discovery messages received from the anchor UEs 202, 203, 204. The measurement information may comprise, for example, reference signal received power (RSRP) of the SL-PRS and/or anchor discovery messages.

In network-assisted sidelink positioning (e.g., based on SL TDOA, SL multi-RTT, etc.), the network (e.g., LMF) may be in full or partial control of the SL positioning. For example, the LMF may be responsible for anchor (re) selection based on at least the measurement information reported from the target UE (e.g., over LPP). However, anchor (re)selection is not a trivial task, as it directly impacts the positioning accuracy. For example, if the selected anchor UEs are colinear with the target UE, the target UE may experience high geometric dilution of precision (GDOP), and the positioning accuracy may decrease significantly. Furthermore, the radio link quality between a given anchor UE and the target UE impacts the reception quality of SL-PRS at the target UE, and hence impacts the positioning accuracy as well. To this end, the target UE may report information related to candidate anchor UEs, so that the LMF can perform informed anchor (re)selection to meet the accuracy requirements of the target UE. Herein candidate anchor UEs (candidate positioning anchors) refer to potential anchor UEs (positioning anchors) that are not yet active in supporting the positioning of the target UE (e.g., not yet transmitting SL-PRS), but have the potential to do so.

For anchor discovery, the candidate anchor UEs may transmit anchor discovery messages over the sidelink (i.e., PC5 interface). The target UE may receive the discovery messages and report the corresponding measurements (including discovery information, such as anchor UE location) to the LMF to assist in anchor (re)selection. Currently, during anchor reselection, the target UE may report the measurements of all the candidate anchor UEs to the LMF. However, this may introduce a large signaling overhead over the Uu interface. The signaling overhead may be even more severe, when there is frequent anchor reselection (which may occur in SL positioning due to UE mobility), and when there is a large number of candidate anchor UEs (e.g., in dense UE deployment scenarios).

Figure 3:
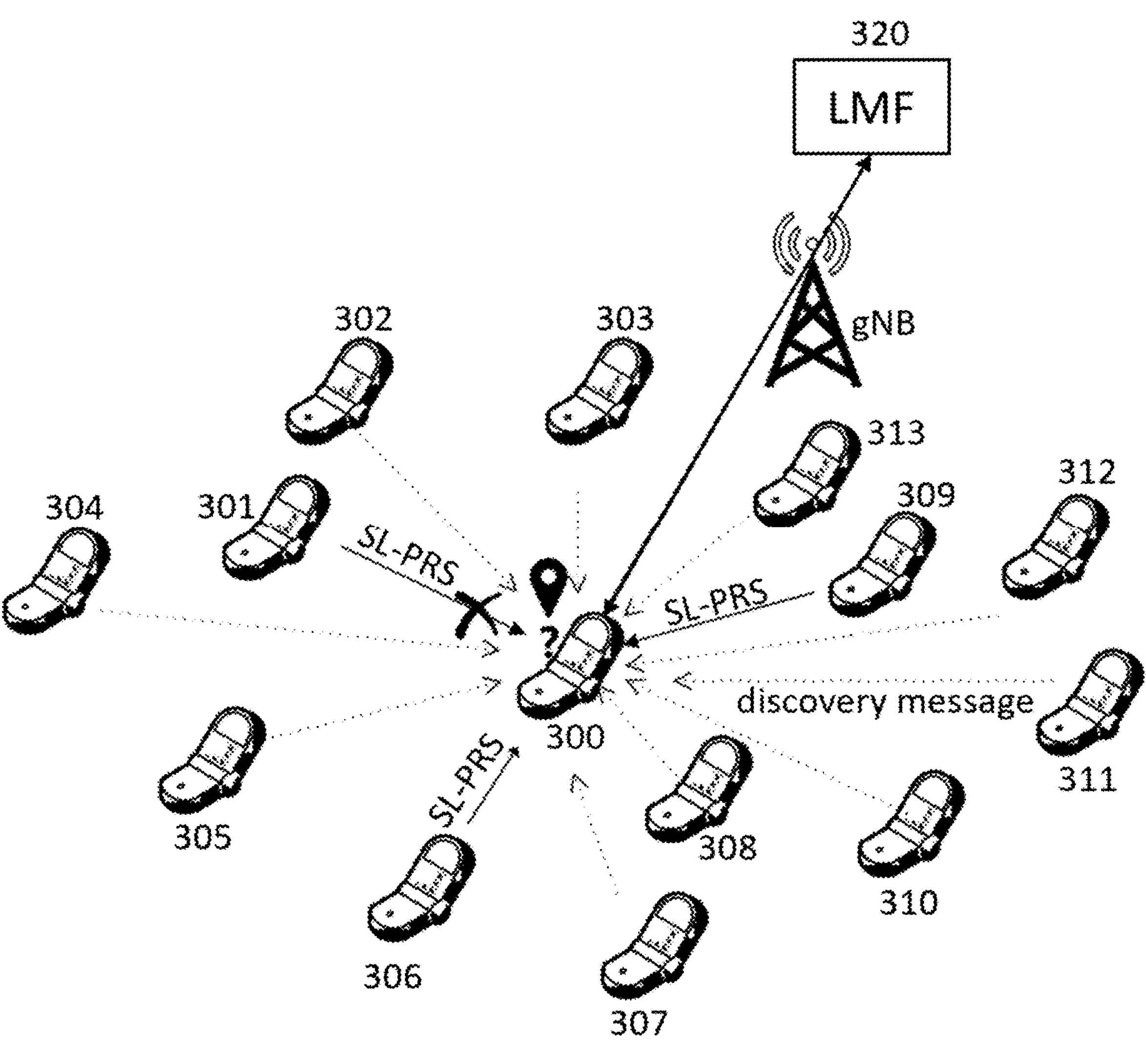
FIG. 3 illustrates an example of candidate positioning anchor measurement reporting.

FIG. 3 illustrates an example of candidate positioning anchor measurement reporting from a target UE 300 to an LMF 320 for anchor reselection, when an active positioning anchor 301 fails to support the target UE 300 in SL positioning. Herein the candidate positioning anchor measurement may comprise discovery-related measurements corresponding to the anchor discovery message transmitted from the set of candidate positioning anchors 302, 303, 304, 305, 307, 308, 310, 311, 312, 313 (e.g., candidate anchor UEs), excluding the active positioning anchors 301, 306, 309. For the active positioning anchors, the target UE 300 may report SL-PRS related measurements, for example. If the target UE 300 reports the discovery-related measurements of all the candidate positioning anchors 302, 303, 304, 305, 307, 308, 310, 311, 312, 313, then this may introduce a large signaling overhead over the Uu interface. Thus, there is a need to improve this suboptimal way of reporting the discovery-related measurements to the LMF in terms of signaling overhead.

Some example embodiments provide a network-assisted candidate positioning anchor filtering mechanism that may be used to reduce the signaling overhead over the Uu interface during anchor reselection.

Some example embodiments are described below using principles and terminology of 5G technology without limiting the example embodiments to 5G communication systems, however.

In an example embodiment, upon detecting the need for a new positioning anchor for a target UE (e.g., having observed that one of the currently active positioning anchors has failed or is in non-line-of-sight conditions relative to the target UE), the LMF may trigger candidate positioning anchor measurement reporting at the target UE, and provide the target UE with assistance information for filtering the candidate positioning anchors. This assistance information may be associated with at least the positioning anchor that is to be replaced, and/or a potential new positioning anchor that is to be added for the target UE. Subsequently, the target UE may filter the candidate positioning anchors based on the received assistance information and report only the filtered candidate positioning anchor measurements to the LMF.

In one example, the LMF may adjust the filtering such that the target UE reports measurement of only those candidate positioning anchor(s), which are likely to meet at least the GDOP criteria (therefore likely to meet the positioning requirement), when selected as a positioning anchor in place of the failed anchor. This way, the signaling overhead in the measurement reporting may be reduced, since the target UE reports measurements associated with some but not all of the candidate positioning anchors. It should be noted GDOP is used as just one example herein, and other criteria can alternatively be used to instruct the target UE on how to filter the measurements.

Considering the impact of GDOP in positioning anchor (re)selection, an awareness at the target UE on which positioning anchor is to be replaced with a new positioning anchor (as part of the anchor reselection procedure) may enable the target UE to filter the candidate positioning anchor measurements in order to reduce the signaling overhead over the Uu interface.

When an active positioning anchor fails and needs to be replaced (while the other active positioning anchors continue to support the target UE), a suitable candidate positioning anchor to replace the failed positioning anchor may share similar geometrical characteristics (e.g., angle w.r.t. the target UE) as that of the failed positioning anchor. In other words, the selection of the replacement anchor may be constrained by the GDOP performance. Hence, when a target UE provides discovery-related measurements of candidate positioning anchors to the LMF, the relevant measurements for the LMF in anchor reselection are the measurements of those candidate positioning anchors, which share similar geometrical characteristics as the failed positioning anchor that needs to be replaced.

Thus, the signaling overhead may be reduced by making the target UE report only the measurements of the relevant candidate positioning anchors (instead of all the discovered candidate positioning anchors). This may also make sidelink positioning more feasible in scenarios with a large number of candidate positioning anchors (e.g., in IoT use cases), and/or scenarios involving a mobile target UE and/or mobile positioning anchors (e.g., in V2X use cases).

For this purpose, the LMF may provide assistance information to the target UE, through which the LMF may convey information about the positioning anchor to be replaced, such as the identity of the failed positioning anchor and/or the geometrical characteristics of the failed positioning anchor relative to the target UE. Using this assistance information, the target UE can then identify the (filtered) subset of candidate positioning anchors that may be of interest in anchor reselection (e.g., identify the candidate positioning anchors that are likely to ensure sufficient GDOP performance, when used as a positioning anchor in place of the failed positioning anchor).

Some example embodiments may be applied, for example, to the system illustrated in FIG. 3. In this case, the target UE 300 may perform filtered candidate positioning anchor measurement reporting to the LMF 320 for anchor reselection, when an active positioning anchor 301 fails to support the target UE 300 in SL positioning. Upon identifying the failed positioning anchor 301, the LMF 320 provides the target UE 300 with assistance information associated with the failed positioning anchor 301.

The assistance information may comprise, for example, at least one of: an identifier of the failed positioning anchor 301 to be replaced (which now acts a reference based on which a new anchor will be selected), a cause for replacing the failed positioning anchor 301, and/or geometrical characteristics of the failed positioning anchor 301 relative to the target UE 300.

The target UE 300 then makes use of this assistance information to identify a subset of one or more candidate positioning anchors from the set of discovered candidate positioning anchors 302, 303, 304, 305, 307, 308, 310, 311, 312, 313, wherein the subset of one or more candidate positioning anchors fulfil at least one criterion associated with the failed positioning anchor 301 to be replaced (e.g., similar geographical characteristics relative to the target UE 300, such as an angle relative to the target UE 300, or the same geographical area/zone relative to the target UE 300, or closer to the failed positioning anchor 301, etc.). For example, the subset of one or more candidate positioning anchors may comprise the candidate positioning anchors 302, 304, which are located in close proximity to the failed positioning anchor 301 to be replaced.

Subsequently, the target UE 300 transmits, to the LMF 320, a filtered candidate positioning anchor measurement report comprising measurement information associated with the subset of one or more candidate positioning anchors 302, 304 (filtered candidate positioning anchors), instead of all the discovered candidate positioning anchors 302, 303, 304, 305, 307, 308, 310, 311, 312, 313. Thus, the signaling overhead over the Uu interface may be reduced. Herein the measurement information reported to the LMF may comprise discovery-related measurements corresponding to the anchor discovery message transmitted from the respective candidate positioning anchors.

Referring to FIG. 3, in an example embodiment, the LMF 320 may be configured to: perform positioning anchor selection and reselection for the target UE 300; determine the need for a new positioning anchor to be added for the target UE 300 (e.g., due to a failure of an existing positioning anchor 301 due to degraded reception quality of the SL PRS at the target UE 300, which is transmitted by the anchor 301); request candidate positioning anchor measurement reporting from the target UE 300 based at least on the determination of the need for a new positioning anchor; and prepare assistance information for candidate positioning anchor filtering, at least based on the "to-be-replaced" positioning anchor and/or the potential new anchor to be added.

The assistance information for candidate positioning anchor filtering may comprise at least one of: an identifier of the positioning anchor to be replaced, geometrical characteristics of the new positioning anchor to be added and/or the positioning anchor to be replaced (e.g., angle or sector of the failed anchor UE w.r.t. the target UE 300), one or more conditions regarding the positioning anchor to be added (e.g., SL PRS RSRP being above a certain threshold), a cause of replacing the positioning anchor to be replaced (e.g., non-line-of-sight conditions, UL transmission prioritization, de-prioritization of the existing session, link failure, etc.).

The LMF 320 may be further configured to: transmit the assistance information to the target UE 300; receive, from the target UE 300, a filtered candidate positioning anchor measurement report comprising the discovery-related measurement information associated with the filtered subset of candidate positioning anchors (but not all of the discovered candidate positioning anchors); perform positioning anchor reselection based at least on the filtered candidate positioning anchor measurement report; and transmit a positioning anchor reconfiguration to the target UE 300, wherein the positioning anchor reconfiguration indicates at least the selected positioning anchor to be added.

The target UE 300 may be configured to: receive a request for candidate positioning anchor measurement reporting from the LMF 320; receive the candidate positioning anchor filtering assistance information from the LMF 320; perform candidate positioning anchor discovery (which may include performing measurement on discovery messages transmitted by the set of discovered candidate positioning anchors 302, 303, 304, 305, 307, 308, 310, 311, 312, 313), or perform anchor discovery based on the candidate anchor filtering (in case of model-B type discovery); filter the discovered candidate anchors based on the candidate positioning anchor filtering assistance information; prepare a filtered candidate anchor measurement report by including the discovery-related measurement information associated with the filtered candidate positioning anchors (but not all of the candidate positioning anchors); transmit the filtered candidate positioning anchor measurement report to the LMF 320; receive a positioning anchor reconfiguration from the LMF 320, wherein the positioning anchor reconfiguration indicates at least the new positioning anchor to be added; and perform SL positioning based on the positioning anchor reconfiguration.

Figure 4:
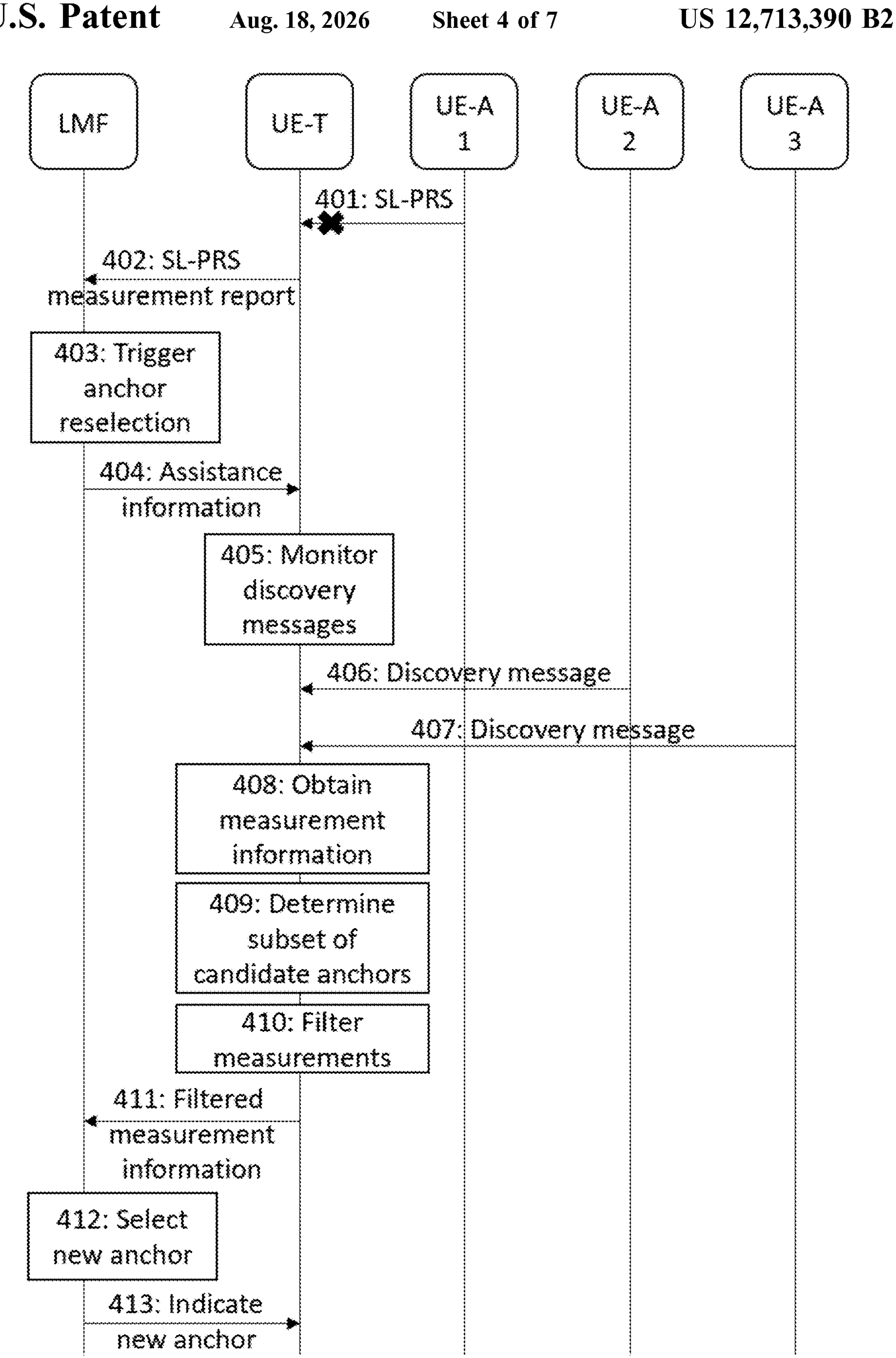
FIG. 4 illustrates a signaling diagram.

FIG. 4 illustrates a signaling diagram according to an example embodiment. Herein the LMF is considered to have already selected a set of positioning anchors for the target user device (target UE), for example based on the full candidate anchor measurement (i.e., measurements of all candidate positioning anchor discovery messages received by the target user device), and the LMF has indicated the selected positioning anchors to the target user device as part of an anchor configuration. In this example embodiment, all (candidate) positioning anchors are considered to be transmitting model-A type anchor discovery messages. The target user device may be performing, for example, SL TDoA-based positioning with the selected positioning anchors. In FIG. 4, UE-A1 denotes one of the currently active positioning anchors of the target UE.

Herein a given positioning anchor or candidate positioning anchor may comprise, for example, an anchor UE, a network node (e.g., a gNB), a road-side unit (RSU), or any other device capable of supporting the positioning of the target user device. An RSU is a UE-type or gNB-type stationary infrastructure entity supporting V2X applications, for example.

Referring to FIG. 4, in block 401, one of the active positioning anchors (UE-A1) of the target user device transmits a reference signal, such as SL-PRS. However, the transmission fails such that it is not detected by the target user device (denoted as UE-T in FIG. 4). For example, the reception quality (e.g., SL-PRS RSRP) of the SL-PRS transmitted by UE-A1 may drop below a certain threshold at the target user device. Thus, the positioning anchor UE-A1 is assumed to have failed.

The target user device may correspond to the target UE 300 of FIG. 3 or the UE 100 of FIG. 1, and UE-A1 may correspond to the failed positioning anchor 301 of FIG. 3 or the UE 102 of FIG. 1.

In block 402, the target user device reports SL-PRS measurement(s) to the LMF. In network-based sidelink positioning, the target user device transmits its SL-PRS measurement(s) to the LMF, and the LMF may calculate the location of the target user device based on this measurement(s). The LMF may correspond to the LMF 320 of FIG. 3 or the LMF 112 of FIG. 1.

As an alternative or in addition to block 402, the target user device or the positioning anchor(s) (e.g., UE-A1) may inform the LMF about a specific positioning anchor(s) (e.g., UE-A1) that they determine to have failed. In addition, to reselect a positioning anchor, the target user device may explicitly request assistance information from the LMF to assist with filtering candidate positioning anchors at the target user device.

In block 403, the LMF triggers anchor reselection upon identifying the failed positioning anchor UE-A1 based on, for example, a drop in the SL-PRS reception quality below a certain threshold, as indicated by the SL-PRS measurement report received from the target user device.

In block 404, the LMF generates and transmits, to the target user device, assistance information associated with at least one of: at least one positioning anchor (e.g., UE-A1) of the target user device to be replaced, or at least one positioning anchor to be added for the target user device. For example, in order to perform anchor reselection, the LMF may transmit a request message to the target user device to request the target user device to report discovery-related measurements of candidate positioning anchors (also referred to as candidate anchor measurement). The assistance information may be comprised in the request message.

The assistance information may comprise, for example, an identifier (e.g., anchor ID) of the at least one positioning anchor to be replaced. This way, the failed positioning anchor may act as a reference based on which a new positioning anchor may be selected.

Alternatively, or additionally, the assistance information may comprise or indicate a cause for replacing the at least one positioning anchor to be replaced. For example, the cause may comprise at least one of: a non-line-of-sight (NLOS) condition between the target user device and the at least one positioning anchor to be replaced, uplink transmission prioritization, de-prioritization of the existing session, or radio link failure.

Alternatively, or additionally, the assistance information may comprise or indicate one or more geometrical characteristics of a positioning anchor relative to the target user device, wherein the positioning anchor comprises at least one of: the at least one positioning anchor to be replaced or the at least one positioning anchor to be added.

The one or more geometrical characteristics of the positioning anchor may comprise at least one of: an angle of the positioning anchor relative to a boresight direction of the target user device, or a geographical area of the positioning anchor relative to the target user device. The boresight direction, also known as the boresight axis, is a reference direction in an antenna system, used to describe the orientation of the antenna in space.

Alternatively, or additionally, the assistance information may comprise or indicate at least one criterion associated with at least one of: the at least one positioning anchor of the target user device to be replaced, or the at least one positioning anchor to be added for the target user device. For example, the at least one criterion may comprise at least a criterion for a signal metric, such as RSRP, of a reference signal (e.g., SL-PRS) being above a threshold. Alternatively, or additionally, the at least one criterion may comprise at least a threshold for geometric dilution of precision, for example for identifying candidate positioning anchors whose GDOP is below the threshold.

Alternatively, or additionally, the assistance information may comprise a group identifier indicating a group of positioning anchors to be added for the target user device.

In block 405, the target user device monitors for discovery messages from candidate positioning anchors. The candidate positioning anchors (e.g., UE-A2, UE-A3) are assumed to be transmitting anchor discovery messages (e.g., periodically). That is, model-A type anchor discovery is assumed.

In case of model-A discovery, each UE that is capable of positioning anchor functionality is considered to be transmitting a discovery message (which may include their location information). When the target user device detects those discovery messages (e.g., RSRP of the discovery message being above a certain threshold), it identifies that there are UEs in the vicinity which are capable of positioning anchor functionality. Such identified UEs can be termed as candidate positioning anchors, since those UEs have the potential to be a positioning anchor for the target user device.

In block 406, the target user device receives a first discovery message from a first candidate positioning anchor (UE-A2). The first discovery message may comprise, for example, location information of the first candidate positioning anchor. The location information indicates the location of the first candidate positioning anchor.

In block 407, the target user device receives a second discovery message from a second candidate positioning anchor (UE-A3). The second discovery message may comprise, for example, location information of the second candidate positioning anchor. The location information indicates the location of the second candidate positioning anchor.

Although two candidate positioning anchors (UE-A2 and UE-A3) are shown in FIG. 4, it should be noted that the number of candidate positioning anchors may also be different than two. In other words, there may be one or more candidate positioning anchors. In addition, the signaling procedure illustrated in FIG. 4 may be extended and applied according to the actual number of candidate positioning anchors.

In block 408, the target user device obtains measurement information associated with a set of one or more discovered candidate positioning anchors by measuring one or more signals, for example the discovery messages, received from the set of one or more discovered candidate positioning anchors. For example, the measurement information may comprise RSRP of the one or more signals (e.g., discovery messages).

The set of one or more discovered candidate positioning anchors refers to the candidate positioning anchor(s), from which the target user device has received a discovery message. For example, the set of one or more discovered candidate positioning anchors may comprise at least the first candidate positioning anchor (UE-A2) and the second candidate positioning anchor (UE-A3).

In block 409, the target user device determines, based on the assistance information, a subset of one or more candidate positioning anchors from the set of one or more discovered candidate positioning anchors, wherein the subset of one or more candidate positioning anchors fulfil the at least one criterion associated with at least one of: the at least one positioning anchor of the target user device to be replaced, or the at least one positioning anchor to be added for the target user device.

The determination of the subset may also be based on the location information of the set of one or more discovered candidate positioning anchors (e.g., included in the discovery messages). That is, the subset of one or more candidate positioning anchors may be determined based at least on the location information and the assistance information.

The subset of one or more candidate positioning anchors may comprise some, but not all, of the set of one or more discovered candidate positioning anchors. For example, the subset of one or more candidate positioning anchors may comprise the first candidate positioning anchor or the second candidate positioning anchor.

As an example, in case the assistance information comprises the identifier (e.g., anchor ID) of the at least one positioning anchor to be replaced (e.g., UE-A1), then the target user device may determine the subset of one or more candidate positioning anchors by identifying one or more candidate positioning anchors that are within a certain distance (e.g., in close proximity) of the at least one positioning anchor to be replaced. To this end, the target user device may make use of the geographical area associated with the identifier (anchor ID), for example by means of a zone ID, to determine the proximity of the candidate positioning anchors to the at least one positioning anchor to be replaced.

As another example, in case the assistance information indicates the geographical area (e.g., zone ID) of the at least one positioning anchor to be replaced, then the target user device may determine the subset of one or more candidate positioning anchors by identifying one or more candidate positioning anchors that are, for example, in the same area/zone or in an adjacent area/zone relative to the at least one positioning anchor to be replaced.

As another example, in case the assistance information indicates the cause of replacing the at least one positioning anchor to be replaced, and the cause is uplink transmission prioritization or deprioritization of the current SL positioning session, then the target user device may determine the subset of one or more candidate positioning anchors by identifying one or more candidate positioning anchors that are in close proximity to the at least one positioning anchor to be replaced (similar to the above examples). On the other hand, if the cause for replacement is an NLOS condition between the target user device and the at least one positioning anchor to be replaced, then the target user device may avoid candidate positioning anchors that are in close proximity of the at least one positioning anchor to be replaced.

As another example, in case the assistance information comprises or indicates a criterion for a signal metric, such as RSRP, of a reference signal being above a threshold, then the target user device may determine the subset of one or more candidate positioning anchors by identifying one or more candidate positioning anchors, from which the target user device has received a signal, such as SL-PRS or a discovery message, with a measured signal metric, such as RSRP, above the threshold that may be indicated in the assistance information.

As another example, in case the assistance information indicates the group identifier of a group of positioning anchors to be used for positioning, then the target user device may determine the subset of one or more candidate positioning anchors by identifying one or more candidate positioning anchors corresponding to the characteristics associated with the group. This group may be determined by the LMF or another core network entity based on various characteristics of the anchors. For example, mobile UEs may be in Group #1, static UEs with known locations may be in Group #2, static UEs with unknown locations may be in Group #3, etc.

In block 410, the target user device filters the measurement information associated with the set of one or more discovered candidate positioning anchors based on the assistance information. That is, the target user device retains the measurements associated with only the subset of one or more candidate positioning anchors (referred to as filtered candidate positioning anchors) that it has determined based on the assistance information received from the LMF. In other words, the measurement information may be filtered such that it does not include measurement information associated with other candidate positioning anchors than the determined subset of one or more candidate positioning anchors.

For example, the filtered measurement information associated with the subset of one or more candidate positioning anchors may be obtained by selecting a subset of measurement information from the measurement information associated with the set of one or more discovered candidate positioning anchors, the subset of measurement information corresponding to the subset of one or more candidate positioning anchors.

In block 411, the target user device transmits, to the LMF, the filtered measurement information associated with the subset of one or more candidate positioning anchors. That is, the target user device reports measurements that are associated with only the subset of one or more candidate positioning anchors, but not all of the discovered candidate positioning anchors, thus reducing the signaling overhead.

In block 412, the LMF selects, based at least on the filtered measurement information, one or more positioning anchors from the subset of one or more candidate positioning anchors to be used for supporting positioning of the target user device. In other words, the LMF performs anchor reselection based on the received filtered measurement report to ensure, for example, low GDOP and hence high positioning accuracy.

In block 413, the LMF transmits, to the target user device, a message indicating the selected one or more positioning anchors to be used for supporting positioning of the target user device. For example, upon selecting the new positioning anchor(s), the LMF may inform the target user device about the change by transmitting an anchor reconfiguration message to the target user device. With this, the target user device can start using the newly selected positioning anchor (s) to continue obtaining SL positioning support (e.g., SL-PRS) for its positioning.

Figure 5:
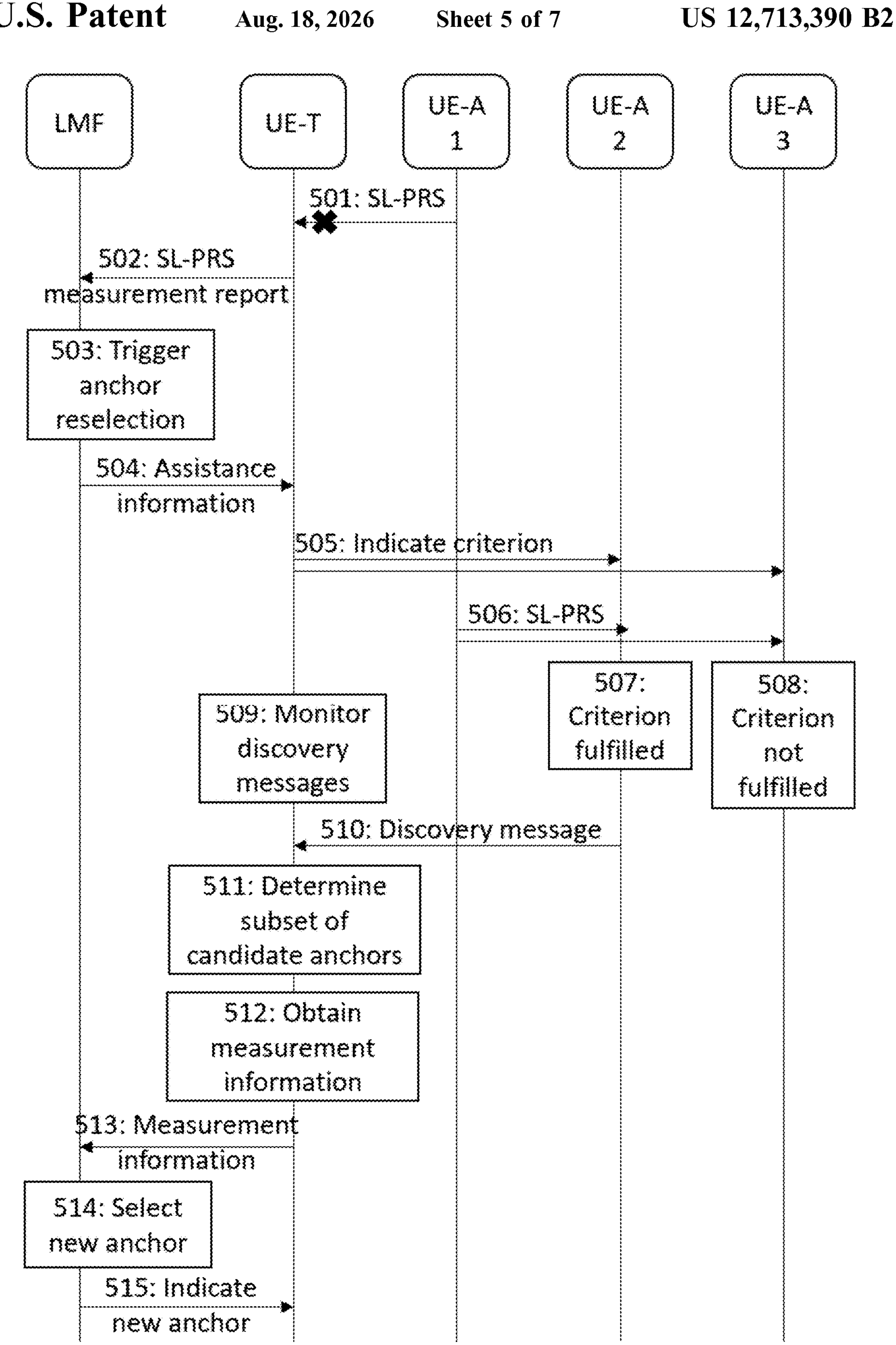
FIG. 5 illustrates a signaling diagram.

FIG. 5 illustrates a signaling diagram according to an example embodiment.

Referring to FIG. 5, in block 501, one of the active positioning anchors (UE-A1) of the target user device (UE-T) transmits a reference signal, such as SL-PRS. However, the transmission fails such that it is not detected by the target user device (denoted as UE-T in FIG. 5). For example, the reception quality (e.g., SL-PRS RSRP) of the SL-PRS transmitted by UE-A1 may drop below a certain threshold at the target user device. Thus, the positioning anchor UE-A1 is assumed to have failed.

The target user device may correspond to the target UE 300 of FIG. 3 or the UE 100 of FIG. 1, and UE-A1 may correspond to the failed positioning anchor 301 of FIG. 3 or the UE 102 of FIG. 1.

In block 502, the target user device reports SL-PRS measurement(s) to the LMF. In network-based sidelink positioning, the target user device transmits its SL-PRS measurement(s) to the LMF, and the LMF may calculate the location of the target user device based on this measurement (s). The LMF may correspond to the LMF 320 of FIG. 3 or the LMF 112 of FIG. 1.

As an alternative or in addition to block 502, the target user device or the positioning anchor(s) (e.g., UE-A1) may inform the LMF about a specific positioning anchor(s) (e.g., UE-A1) that they determine to have failed. In addition, to reselect a positioning anchor, the target user device may explicitly request assistance information from the LMF to assist with filtering candidate positioning anchors at the target user device.

In block 503, the LMF triggers anchor reselection upon identifying the failed positioning anchor UE-A1 based on, for example, a drop in the SL-PRS reception quality below a certain threshold, as indicated by the SL-PRS measurement report received from the target user device.

In block 504, the LMF generates and transmits, to the target user device, assistance information associated with at least one of: at least one positioning anchor (e.g., UE-A1) of the target user device to be replaced, or at least one positioning anchor to be added for the target user device. For example, in order to perform anchor reselection, the LMF may transmit a request message to the target user device to request the target user device to report discovery-related measurements of candidate positioning anchors (also referred to as candidate anchor measurement). The assistance information may be comprised in the request message.

The assistance information may comprise or indicate at least one criterion associated with at least one of: the at least one positioning anchor of the target user device to be replaced, or the at least one positioning anchor to be added for the target user device.

For example, the assistance information may comprise at least a criterion for a signal metric, such as RSRP, with respect to the at least one positioning anchor to be replaced. In this case, the target user device may use model-B type discovery and convey the criterion to the candidate positioning anchors for example in a discovery solicitation message. Then, only those candidate positioning anchors which fulfil the criterion respond to the target user device and are considered to be the filtered subset of candidate positioning anchors. For example, the candidate positioning anchors may measure SL-PRS RSRP with respect to the at least one positioning anchor to be replaced, and if the RSRP is above a certain indicated threshold (which implies that the candidate anchor is in close proximity to the anchor to be replaced), they respond to the discovery solicitation message.

In block 505, the target user device transmits, to a set of one or more candidate positioning anchors, information comprising the criterion for the signal metric. The information may be transmitted, for example, by broadcast or unicast or multicast transmission. For example, the information may be transmitted in an anchor discovery solicitation message.

In block 506, the positioning anchor to be replaced (UE-A1) transmits a reference signal, for example SL-PRS, which is received by one or more candidate positioning anchors (e.g., UE-A2 and UE-A3).

In block 507, a first candidate positioning anchor (UE-A2) evaluates, based on the reference signal received from the positioning anchor to be replaced, whether the first candidate positioning anchor fulfils the criterion for the signal metric. In this example, the first candidate positioning anchor fulfils the at least one criterion (e.g., RSRP of the reference signal is above a threshold).

In block 508, a second candidate positioning anchor (UE-A3) evaluates, based on the reference signal received from the positioning anchor to be replaced, whether the second candidate positioning anchor fulfils the criterion for the signal metric. In this example, the second candidate positioning anchor does not fulfil the criteria (e.g., RSRP of the reference signal is below the threshold).

Although two candidate positioning anchors (UE-A2 and UE-A3) are shown in FIG. 5, it should be noted that the number of candidate positioning anchors may also be different than two. In other words, there may be one or more candidate positioning anchors. In addition, the signaling procedure illustrated in FIG. 5 may be extended and applied according to the actual number of candidate positioning anchors.

In block 509, the target user device monitors for discovery messages from candidate positioning anchors.

In block 510, the target user device receives one or more signals, for example one or more discovery messages, from a subset of one or more candidate positioning anchors, wherein the one or more signals are transmitted from the subset of one or more candidate positioning anchors based on the subset of one or more candidate positioning anchors fulfilling the criterion for the signal metric. The one or more discovery messages may comprise, for example, location information of the subset of one or more candidate positioning anchors.

For example, the first candidate positioning anchor (UE-A2) may transmit a signal (e.g., discovery message) to the target user device based on the first candidate positioning anchor fulfilling the criterion for the signal metric. However, the second candidate positioning anchor (UE-A3) may not transmit the signal (e.g., discovery message), if the second candidate positioning anchor does not fulfil the criterion for the signal metric.

In block 511, the target user device determines the subset of one or more candidate positioning anchors (e.g., UE-A2) from the set of one or more candidate positioning anchors (e.g., UE-A2 and UE-A3), wherein the subset of one or more candidate positioning anchors fulfil the criterion for the signal metric. In this example embodiment, the subset of one or more candidate positioning anchor may be determined by including some or all of the discovered candidate positioning anchor(s), from which the target user device has received the discovery message, since those candidate positioning anchor(s) fulfil the criterion for the signal metric.

In block 512, the target user device obtains measurement information associated with the subset of one or more candidate positioning anchors by measuring the one or more signals (e.g., discovery messages) received from the subset of one or more candidate positioning anchors. For example, the measurement information may comprise RSRP of the one or more signals (e.g., discovery messages).

In block 513, the target user device transmits, to the LMF, the measurement information associated with the subset of one or more candidate positioning anchors.

In block 514, the LMF selects, based at least on the measurement information, one or more positioning anchors from the subset of one or more candidate positioning anchors to be used for supporting positioning of the target user device. In other words, the LMF performs anchor reselection based on the received filtered measurement report to ensure, for example, low GDOP and hence high positioning accuracy.

In block 515, the LMF transmits, to the target user device, a message indicating the selected one or more positioning anchors to be used for supporting positioning of the target user device. For example, upon selecting the new positioning anchor(s), the LMF may inform the target user device about the change by transmitting an anchor reconfiguration message to the target user device. With this, the target user device can start using the newly selected positioning anchor (s) to continue obtaining SL positioning support (e.g., SL-PRS) for its positioning.

Figure 6:
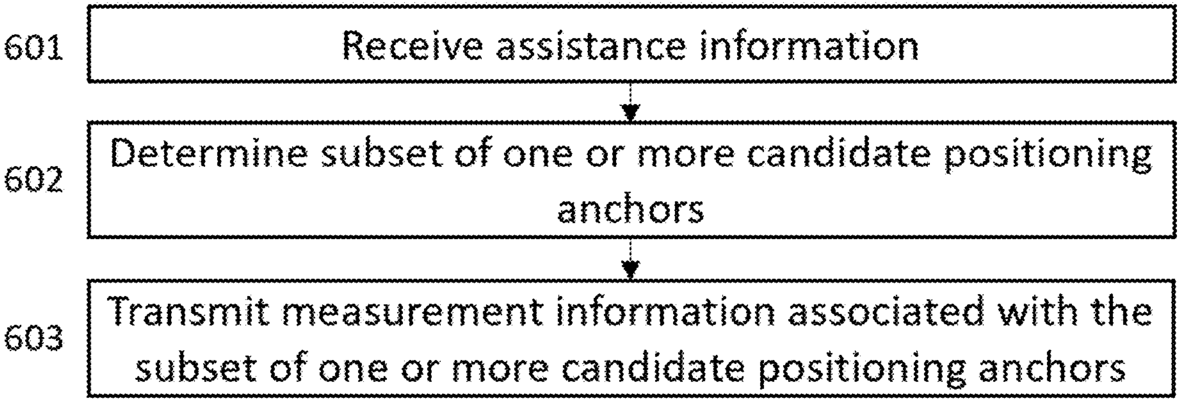
FIG. 6 illustrates a flow chart.

FIG. 6 illustrates a flow chart according to an example embodiment of a method performed by an apparatus. For example, the apparatus may be, or comprise, or be comprised in, a user device. The user device may also be called a subscriber unit, mobile station, remote terminal, access terminal, user terminal, terminal device, or user equipment (UE). The user device may correspond to one of the user devices 100, 102 of FIG. 1, or to the target UE 300 of FIG. 3.

Referring to FIG. 6, in block 601, assistance information is received, the assistance information associated with at least one of: at least one positioning anchor of the apparatus to be replaced, or at least one positioning anchor to be added for the apparatus;

In block 602, based on the assistance information, a subset of one or more candidate positioning anchors is determined from a set of one or more discovered candidate positioning anchors, wherein the subset of one or more candidate positioning anchors fulfil at least one criterion associated with at least one of: the at least one positioning anchor of the apparatus to be replaced, or the at least one positioning anchor to be added for the apparatus.

In block 603, the measurement information associated with the subset of one or more candidate positioning anchors is transmitted.

Figure 7:
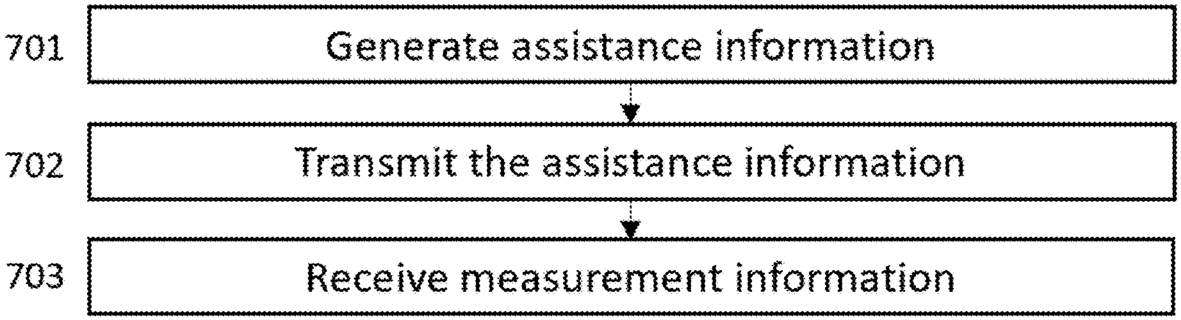
FIG. 7 illustrates a flow chart.

FIG. 7 illustrates a flow chart according to an example embodiment of a method performed by an apparatus. For example, the apparatus may correspond to the core network 110 or LMF 112 of FIG. 1, or to the LMF 320 of FIG. 3.

Referring to FIG. 7, in block 701, assistance information is generated for assisting a user device to determine a subset of one or more candidate positioning anchors from a set of one or more discovered candidate positioning anchors, wherein the assistance information is associated with at least one of: at least one positioning anchor of the user device to be replaced, or at least one positioning anchor to be added for the user device. In block 702, the assistance information is transmitted to the user device.

In block 703, measurement information is received from the user device, the measurement information associated with the subset of one or more candidate positioning anchors, wherein the subset of one or more candidate positioning anchors fulfil at least one criterion associated with at least one of: the at least one positioning anchor of the user device to be replaced, or the at least one positioning anchor to be added for the user device.

The blocks, related functions, and information exchanges (messages) described above by means of FIGS. 4-7 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 8:
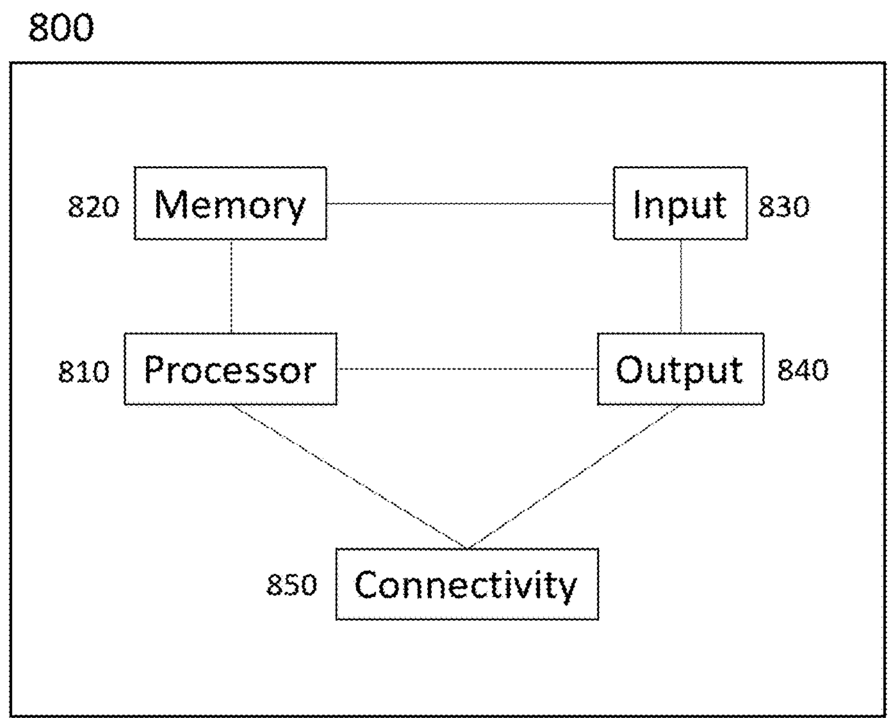
FIG. 8 illustrates an example of an apparatus.

FIG. 8 illustrates an example of an apparatus 800 comprising means for performing one or more of the example embodiments described above. For example, the apparatus 800 may be an apparatus such as, or comprising, or comprised in, a user device. The user device may correspond to one of the user devices 100, 102 of FIG. 1, or the target UE 300 of FIG. 3, or UE-T of FIG. 4 or FIG. 5. The user device may also be called a subscriber unit, mobile station, remote terminal, access terminal, user terminal, terminal device, or user equipment (UE).

The apparatus 800 may comprise a circuitry or a chipset applicable for realizing one or more of the example embodiments described above. For example, the apparatus 800 may comprise at least one processor 810. The at least one processor 810 interprets instructions (e.g., computer program instructions) and processes data. The at least one processor 810 may comprise one or more programmable processors. The at least one processor 810 may comprise programmable hardware with embedded firmware and may, alternatively or additionally, comprise one or more application-specific integrated circuits (ASICs).

The at least one processor 810 is coupled to at least one memory 820. The at least one processor is configured to read and write data to and from the at least one memory 820. The at least one memory 820 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The at least one memory 820 stores computer readable instructions that are executed by the at least one processor 810 to perform one or more of the example embodiments described above. For example, non-volatile memory stores the computer readable instructions, and the at least one processor 810 executes the instructions using volatile memory for temporary storage of data and/or instructions. The computer readable instructions may refer to computer program code.

The computer readable instructions may have been prestored to the at least one memory 820 or, alternatively or additionally, they may be received, by the apparatus, via an electromagnetic carrier signal and/or may be copied from a physical entity such as a computer program product. Execution of the computer readable instructions by the at least one processor 810 causes the apparatus 800 to perform one or more of the example embodiments described above. That is, the at least one processor and the at least one memory storing the instructions may provide the means for providing or causing the performance of any of the methods and/or blocks described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 800 may further comprise, or be connected to, an input unit 830. The input unit 830 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 830 may comprise an interface to which external devices may connect to.

The apparatus 800 may also comprise an output unit 840. The output unit may comprise or be connected to one or more displays capable of rendering visual content, such as a light emitting diode (LED) display, a liquid crystal display (LCD) and/or a liquid crystal on silicon (LCoS) display. The output unit 840 may further comprise one or more audio outputs. The one or more audio outputs may be for example loudspeakers.

The apparatus 800 further comprises a connectivity unit 850. The connectivity unit 850 enables wireless connectivity to one or more external devices. The connectivity unit 850 comprises at least one transmitter and at least one receiver that may be integrated to the apparatus 800 or that the apparatus 800 may be connected to. The at least one transmitter comprises at least one transmission antenna, and the at least one receiver comprises at least one receiving antenna. The connectivity unit 850 may comprise an integrated circuit or a set of integrated circuits that provide the wireless communication capability for the apparatus 800. Alternatively, the wireless connectivity may be a hardwired application-specific integrated circuit (ASIC). The connectivity unit 850 may also provide means for performing at least some of the blocks of one or more example embodiments described above. The connectivity unit 850 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 800 may further comprise various components not illustrated in FIG. 8. The various components may be hardware components and/or software components.

Figure 9:
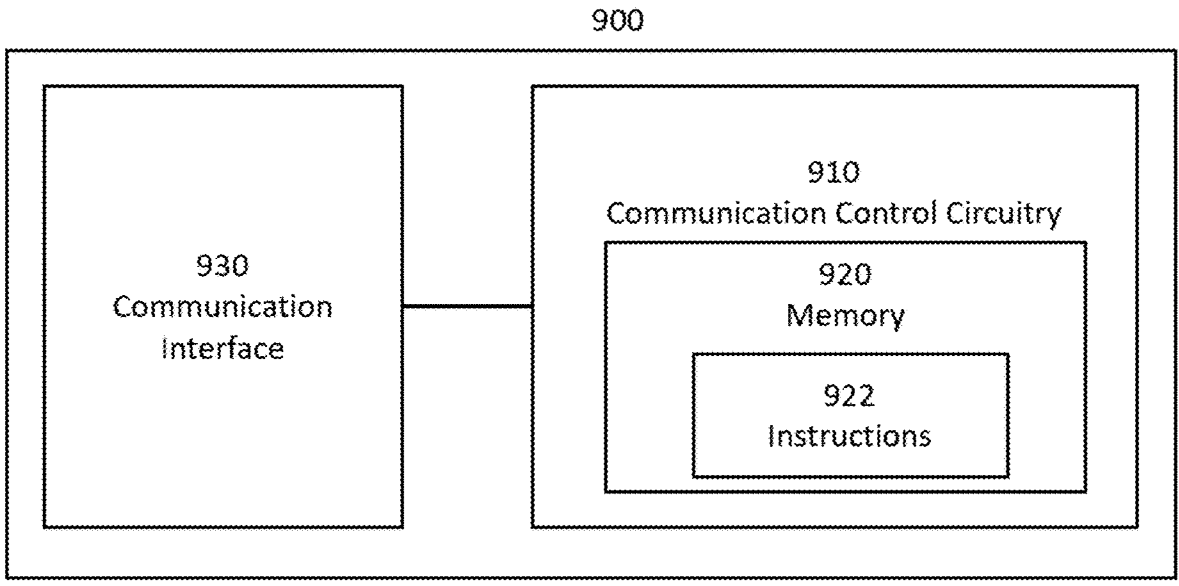
FIG. 9 illustrates an example of an apparatus.

FIG. 9 illustrates an example of an apparatus 900 comprising means for performing one or more of the example embodiments described above. For example, the means may be provided by a location management function (LMF) of a core network. The apparatus 900 may correspond to the core network 110 or LMF 112 of FIG. 1, or to the LMF 320 of FIG. 3, or to the LMF of FIG. 4 or FIG. 5.

The apparatus 900 may comprise, for example, a circuitry or a chipset applicable for realizing one or more of the example embodiments described above. The apparatus 900 may be an electronic device comprising one or more electronic circuitries. The apparatus 900 may comprise a communication control circuitry 910 such as at least one processor, and at least one memory 920 storing instructions 922 which, when executed by the at least one processor, cause the apparatus 900 to carry out one or more of the example embodiments described above. Such instructions 922 may, for example, include a computer program code (software), wherein the at least one memory and the computer program code (software) are configured, with the at least one processor, to cause the apparatus 900 to carry out one or more of the example embodiments described above. The at least one processor and the at least one memory storing the instructions may provide the means for providing or causing the performance of any of the methods and/or blocks described above.

The processor is coupled to the memory 920. The processor is configured to read and write data to and from the memory 920. The memory 920 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 920 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

The memory 920 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 900 may further comprise a communication interface 930 comprising hardware and/or software for realizing communication connectivity according to one or more communication protocols. The communication interface 930 may comprise at least one transmitter (Tx) and at least one receiver (Rx) that may be integrated to the apparatus 900 or that the apparatus 900 may be connected to. The communication interface 930 may provide means for performing some of the blocks for one or more example embodiments described above. The communication interface 930 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 930 provides the apparatus with communication capabilities to communicate in the cellular communication system. The communication interface may, for example, provide a radio, cable or fiber interface to one or more network nodes and/or one or more user devices of a radio access network.

It is to be noted that the apparatus 900 may further comprise various components not illustrated in FIG. 9. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory (ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An apparatus comprising at least one processor, and at least one memory storing instructions that, when executed by the at least one processor, cause the apparatus at least to:

receive assistance information associated with at least one of: at least one positioning anchor of the apparatus to be replaced, or at least one positioning anchor to be added for the apparatus;

determine, based on the assistance information, a subset of one or more candidate positioning anchors from a set of one or more discovered candidate positioning anchors, wherein the subset of one or more candidate positioning anchors fulfil at least one criterion associated with at least one of: the at least one positioning anchor of the apparatus to be replaced, or the at least one positioning anchor to be added for the apparatus; and transmit measurement information associated with the subset of one or more candidate positioning anchors;

wherein the assistance information comprises an identifier of the at least one positioning anchor to be replaced.

2. The apparatus according to claim 1, wherein the transmitted measurement information does not include measurement information associated with other candidate positioning anchors than the determined subset of one or more candidate positioning anchors.

3. The apparatus according to claim 1, wherein the at least one criterion is indicated by the assistance information or comprised in the assistance information.

4. The apparatus according to claim 1, wherein the assistance information comprises or indicates a cause for replacing the at least one positioning anchor to be replaced.

5. The apparatus according to claim 1, wherein the assistance information comprises or indicates one or more geometrical characteristics of a positioning anchor relative to the apparatus, wherein the positioning anchor comprises at least one of: the at least one positioning anchor to be replaced or the at least one positioning anchor to be added.

6. The apparatus according to claim 5, wherein the one or more geometrical characteristics of the positioning anchor comprise at least one of: an angle of the positioning anchor relative to a boresight direction of the apparatus, or a geographical area of the positioning anchor relative to the apparatus.

7. The apparatus according to claim 1, further being caused to:

receive, from the set of one or more discovered candidate positioning anchors, location information of the set of one or more discovered candidate positioning anchors, wherein the subset of one or more candidate positioning anchors is determined based at least on the location information and the assistance information.

8. The apparatus according to claim 1, further being caused to:

obtain measurement information associated with the set of one or more discovered candidate positioning anchors by measuring one or more signals received from the set of one or more discovered candidate positioning anchors, wherein the transmitted measurement information associated with the subset of one or more candidate positioning anchors is obtained by selecting a subset of measurement information from the measurement information associated with the set of one or more discovered candidate positioning anchors, the subset of measurement information corresponding to the subset of one or more candidate positioning anchors.

9. The apparatus according to claim 1, wherein the at least one criterion comprises at least a criterion for a signal metric of a reference signal.

10. The apparatus according to claim 9, further being caused to:

transmit, to the set of one or more discovered candidate positioning anchors, information comprising at least the criterion for the signal metric; and receive one or more signals from the subset of one or more candidate positioning anchors, wherein the one or more signals are transmitted from the subset of one or more candidate positioning anchors based on the subset of one or more candidate positioning anchors fulfilling the criterion for the signal metric, wherein the measurement information associated with the subset of one or more candidate positioning anchors is obtained by measuring the one or more signals received from the subset of one or more candidate positioning anchors.

11. The apparatus according to claim 1, wherein the at least one criterion comprises at least a threshold for geometric dilution of precision.

12. The apparatus according to claim 1, wherein the assistance information comprises a group identifier indicating a group of positioning anchors to be added for the apparatus.

13. An apparatus comprising at least one processor, and at least one memory storing instructions that, when executed by the at least one processor, cause the apparatus at least to:

generate assistance information for assisting a user device to determine a subset of one or more candidate positioning anchors from a set of one or more discovered candidate positioning anchors, wherein the assistance information is associated with at least one of: at least one positioning anchor of the user device to be replaced, or at least one positioning anchor to be added for the user device;

transmit the assistance information to the user device; and receive, from the user device, measurement information associated with the subset of one or more candidate positioning anchors, wherein the subset of one or more candidate positioning anchors fulfil at least one criterion associated with at least one of: the at least one positioning anchor of the user device to be replaced, or the at least one positioning anchor to be added for the user device;

wherein the assistance information comprises at least one of: an identifier of the at least one positioning anchor to be replaced, or a cause for replacing the at least one positioning anchor to be replaced.

14. The apparatus according to claim 13, further being caused to:

select, based at least on the measurement information, one or more positioning anchors from the subset of one or more candidate positioning anchors; and transmit, to the user device, a message indicating the selected one or more positioning anchors to be used for supporting positioning of the user device.

15. The apparatus according to claim 13, wherein the received measurement information does not include measurement information associated with other candidate positioning anchors than the subset of one or more candidate positioning anchors.

16. The apparatus according to claim 13, wherein the assistance information comprises or indicates one or more geometrical characteristics of a positioning anchor relative to the user device, wherein the positioning anchor comprises at least one of: the at least one positioning anchor to be replaced or the at least one positioning anchor to be added.

17. The apparatus according to claim 16, wherein the one or more geometrical characteristics of the positioning anchor comprise at least one of: an angle of the positioning anchor relative to a boresight direction of the user device, or a geographical area of the positioning anchor relative to the user device.

18. The apparatus according to claim 13, wherein the at least one criterion comprises at least a criterion for a signal metric of a reference signal.

* * * * *